US012737465B2

(12) United States Patent
Rahiman et al.

(10) Patent No.: US 12,737,465 B2
(45) Date of Patent: Sep. 15, 2026

(54) VALIDATED MOVEMENT OF HARDWARE WITHIN AN IHS CLUSTER

(71) Applicant: Dell Products, L.P., Round Rock, TX (US)

(72) Inventors: Shinose Abdul Rahiman, Bangalore (IN); Rama Rao Bisa, Bangalore (IN); Mini Thottunkal Thankappan, Bangalore (IN); Vineeth Radhakrishnan, Palakkad (IN); Dharma Bhushan Ramaiah, Bangalore (IN); A Anis Ahmed, Bangalore (IN); Jason Matthew Young, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 210 days.

(21) Appl. No.: 18/512,108

(22) Filed: Nov. 17, 2023

(65) Prior Publication Data

US 2025/0165606 A1 May 22, 2025

(51) Int. Cl.
*G06F 21/57* (2013.01)
*G06F 21/64* (2013.01)
*G06F 21/73* (2013.01)

(52) U.S. Cl.
CPC ............ *G06F 21/572* (2013.01); *G06F 21/64* (2013.01); *G06F 21/73* (2013.01)

(58) Field of Classification Search
CPC ......... G06F 21/572; G06F 21/64; G06F 21/73
See application file for complete search history.

(56) References Cited

U.S. PATENT DOCUMENTS

2019/0392148 A1* 12/2019 Ganesan ............... G06F 9/4411
2021/0124846 A1* 4/2021 Buhlinger ............... G06F 21/44
2021/0349836 A1* 11/2021 Benedict ............. G06F 12/1433
2022/0207145 A1* 6/2022 Young .................. G06F 21/575
2022/0207186 A1* 6/2022 Young ..................... G06F 21/64

* cited by examiner

*Primary Examiner* — Moeen Khan
*Assistant Examiner* — Thomas A Carnes
(74) *Attorney, Agent, or Firm* — Fogarty LLP

(57) ABSTRACT

Systems and methods are provided for validated transfer of replaceable hardware components within a computing cluster comprised of multiple IHSs (Information Handling Systems), such as rack-mounted servers. During factory provisioning of the IHS, a factory-signed inventory certificate is uploaded to each IHS that identifies factory-installed hardware of the IHS. This inventory certificate is used to validate that the detected hardware of the IHS is genuine factory-installed hardware. Upon a successful validation of detected hardware by an IHS, a cluster management console is notified. Based on the notifications of validated hardware by the IHS, the cluster management console identifies replaceable hardware components installed within IHSs that are members of the computing cluster. The cluster management console generates a delta certificate that authorizes operation by the IHS of the replaceable hardware components installed within IHSs that are members of the computing cluster.

18 Claims, 9 Drawing Sheets

600

VALIDATED MOVEMENT OF HARDWARE WITHIN AN IHS CLUSTER

CROSS REFERENCE TO RELATED APPLICATIONS

Related subject matter is contained in co-pending U.S. patent application Ser. No. 18/509,533, entitled "Validated Movement of Component Transfers between Information Handling Systems," filed on Nov. 15, 2023, the disclosure of which is hereby incorporated by reference.

FIELD

The present disclosure relates generally to Information Handling Systems (IHSs), and relates more particularly to supporting secure modifications to IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise-class servers that are stacked and installed within racks. A data center may include large numbers of such racks that may be organized into rows, where the servers installed in each rack may be outwardly very similar looking, such that it may be difficult for administrators to effectively keep track of the configurations and capabilities of any individual server in the data center. Moreover, administration of such large groups of servers may require teams of remote and local administrators working in shifts in order to support around-the-clock availability of the data center operations, while also minimizing any downtime. Each server IHS within a data center may support a wide variety of possible hardware and software configurations. For instance, each individual server IHS may be manufactured accordingly to customized hardware and software configurations requested by a customer. Once an IHS has been received and deployed, a customer may make modifications to the hardware and software of the IHS in order to adapt it for a particular computing task or a particular physical environment. In a data center environment, hardware components may be switched between IHSs, such as between rack-mounted servers.

Multiple IHSs, such as rack-mounted servers, may be logically and/or physically organized into a computing cluster. A cluster may be comprised of a group of identical IHSs, or may be comprised of various different types of IHS. In either scenario, a computing cluster is typically operable as a single system, without regard to its individual member IHSs. The individual IHSs of a cluster are typically interconnected by low-latency and high-bandwidth networks connections that support high speed communications between the members of the cluster, thus supporting distribution of computing tasks among the IHSs of the cluster.

SUMMARY

In various embodiments, systems and methods include an IHS (Information Handling System) that is a member of a computing cluster, where the IHS is configured to: validate hardware detected by the IHS as factory-installed based on an inventory specified in a factory-provisioned inventory certificate; notify a cluster management console when the hardware detected by the IHS is validated as factory-installed based on the inventory certificate; and receive a delta certificate from the cluster management console, wherein the delta certificate authorizes operation by the IHS of a plurality of replaceable hardware components installed within IHSs that are members of the computing cluster; and the cluster management console configured to: based on the notification of validated hardware from the IHS, identify the plurality of replaceable hardware components installed within IHSs that are members of the computing cluster; and obtain the delta certificate that authorizes operation by the IHS of the plurality of replaceable hardware components installed within IHSs that are members of the computing cluster.

In some embodiments, the notification provided to the cluster management console comprises a plurality of unique identifiers for identifying a first replaceable hardware component detected by the IHS. In some embodiments, the notification provided to the cluster management console comprises a digital signature for validating the first replaceable hardware component detected by the IHS as a factory-installed hardware component of the IHS. In some embodiments, the notification provided to the cluster management console comprises a device identity certificate for validating the first replaceable hardware component. In some embodiments, the factory-provisioned inventory certificate is stored to a persistent memory of the IHS during the factory-provisioning of the IHS. In some embodiments, the delta certificate is stored to the persistent memory used to store the factory-provisioned inventory certificate IHS. In some embodiments, the IHS comprises a remote access controller and wherein the cluster management console interfaces with the remote access controller in managing the IHS membership i the computing cluster. In some embodiments, the cluster management console is further configured to distribute the generated delta certificate to all of the IHSs that are members of the computing cluster. In some embodiments, the distributed delta certificate validates operation of the replaceable hardware component reported by the IHS by all of the IHSs that are members of the computing cluster. In some embodiments, the replaceable hardware components comprise storage drives.

BRIEF DESCRIPTION OF THE DRAWINGS

The present invention(s) is/are illustrated by way of example and is/are not limited by the accompanying figures.

Elements in the figures are illustrated for simplicity and clarity, and have not necessarily been drawn to scale.

DETAILED DESCRIPTION

Figure 1:
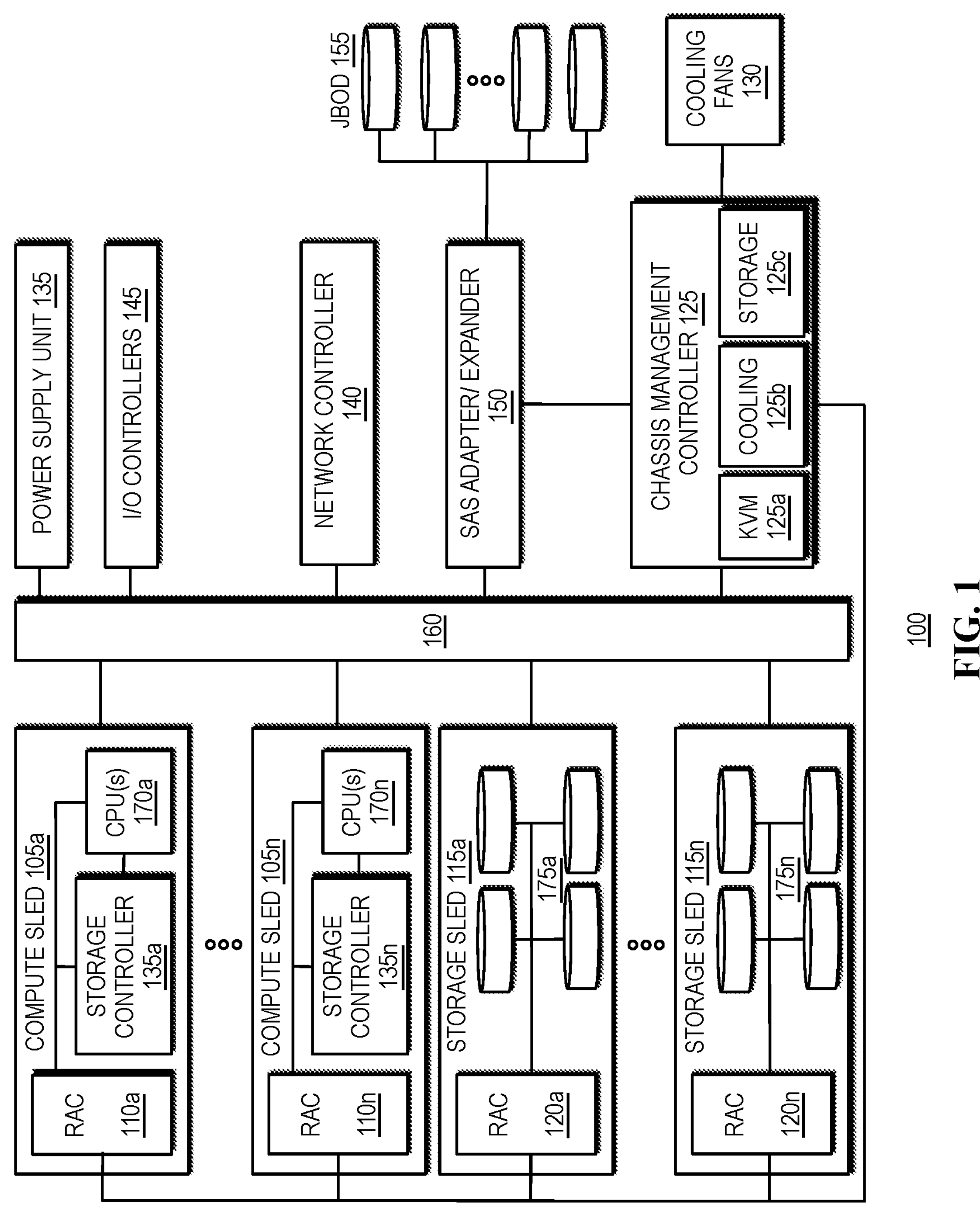
FIG. 1 is a diagram illustrating certain components of a chassis configured, according to some embodiments, for supporting validated transfer of replaceable hardware components within a cluster of IHSs installed in one or more chassis.

FIG. 1 is a block diagram illustrating certain components of a chassis 100 comprising one or more compute sleds 105*a-n* and one or more storage sleds 115*a-n* that may be configured to implement the systems and methods described herein for validated transfer of replaceable hardware components within a cluster of IHSs that may span multiple chassis. Embodiments of chassis 100 may include a wide variety of different hardware configurations. Such variations in hardware configuration may result from chassis 100 being factory assembled to include components specified by a customer that has contracted for manufacture and delivery of chassis 100. Upon delivery of a chassis 100, the chassis and/or individual IHS sleds installed in the chassis 100, may be modified by replacing various hardware components or by installing new hardware components.

As described in additional detail below, chassis 100 may include capabilities that allow a customer to validate that hardware that has been detected as installed in chassis 100 is the same factory installed and provisioned hardware that was supplied to the customer. In addition, embodiments support secure modifications in which designated replaceable hardware components can be moved between different IHSs (e.g., compute sleds 105*a-n* and storage sleds 115*a-n*) that are members of the same computing cluster, where the IHSs that are the members of the cluster may all be installed within a single chassis 100, or may be spread across multiple chassis 100 that are configured according to the embodiments described herein. Various of the fixed and replaceable hardware components of chassis 100 may be used in implementing computing clusters that span multiple processing components of chassis 100, such as clusters spanning multiple compute sleds 105*a-n* and/or storage sleds 115*a-n* that are installed in chassis 100, or spanning multiple chassis 100. Such clusters may be implemented using high-speed data links between the processing components of the cluster, such as PCIe connections between compute sleds 105*a-n*.

Chassis 100 may include one or more bays that each receive an individual sled (that may be additionally or alternatively referred to as a tray, blade, and/or node), such as compute sleds 105*a-n* and storage sleds 115*a-n*. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105*a-n* and storage sleds 115*a-n*, thus providing efficiency improvements and supporting greater computational loads. In some instances, these shared resources of chassis 100 are implemented through hardware components of chassis 100 that are shared by multiple of the compute sleds 105*a-n* and storage sleds 115*a-n* installed in the chassis.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105*a-n*, 115*a-n* installed within the chassis. A rack and a chassis 100 installed within the rack may utilize various configurations and combinations of cooling fans to cool the sleds 105*a-n*, 115*a-n* and other components housed within chassis 100.

The sleds 105*a-n*, 115*a-n* may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135. In some embodiments, a backplane 160 may be uniquely identified based on a code or other identifier that may be permanently encoded in a non-volatile memory of the backplane 160 by its manufacturer. As described below, embodiments may support validation of backplane 160 as being the same backplane that was installed at the factory during the manufacture of chassis 100.

In certain embodiments, a compute sled 105*a-n* may be an IHS such as described with regard to IHS 200 of FIG. 2. A compute sled 105*a-n* may provide computational processing resources that may be used to support a variety of e-commerce, multimedia, business and scientific computing applications, such as services provided via a cloud implementation. Compute sleds 105*a-n* are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105*a-n* may be configured for general-purpose computing or may be optimized for specific computing tasks.

As illustrated, each compute sled 105*a-n* includes a remote access controller (RAC) 110*a-n*. As described in additional detail with regard to FIG. 2, remote access controller 110*a-n* provides capabilities for remote monitoring and management of compute sled 105*a-n*. In support of these monitoring and management functions, remote access controllers 110*a-n* may utilize both in-band and sideband (i.e., out-of-band) communications with various components of a compute sled 105*a-n* and chassis 100. Remote access controllers 110*a-n* may collect various types of sensor data, such as collecting temperature sensor readings that are used in support of airflow cooling of the chassis 100 and the sleds 105*a-n*, 115*a-n*. In addition, each remote access controller 110*a-n* may implement various monitoring and administrative functions related to compute sleds 105*a-n* that utilize sideband bus connections with various internal components of the respective compute sleds 105*a-n*.

In some embodiments, each compute sled 105*a-n* installed in chassis 100 may be uniquely identified based on a code or other identifier that may be permanently encoded in a non-volatile memory of a respective compute sled 105*a-n* by its manufacturer. As described below, during a provisioning phase of the factory assembly of chassis 100, a signed certificate that specifies hardware components of chassis 100, such as through such identifiers of compute sleds 105*a-n*, that were installed during its manufacture may be stored in a non-volatile memory accessed by a remote access controller 110*a-n* of a compute sled 105*a-n*. Using this signed inventory certificate, a customer may validate that the hardware components of chassis 100 are the same components that were installed at the factory during its manufacture. As described in additional detail below, embodiments further support secure validation of the movement of replaceable hardware components between the members of a computing cluster, such as clusters formed from logically and/or physically linking multiple compute sleds 105*a-n* installed in one or more chassis 100.

Each of the compute sleds 105*a-n* may include a storage controller 135*a-n* that may be utilized to access storage drives that are accessible via chassis 100. Some of the individual storage controllers 135*a-n* may provide support for RAID (Redundant Array of Independent Disks) configurations of logical and physical storage drives, such as storage drives provided by storage sleds 115*a-n*. In some embodiments, some or all of the individual storage controllers 135*a-n* may be HBAs (Host Bus Adapters) that provide more limited capabilities in accessing physical storage drives provided via storage sleds 115*a-n* and/or via SAS expander 150.

In addition to the data storage capabilities provided by storage sleds 115*a-n*, chassis 100 may provide access to other shared storage resources that may be installed components of chassis 100 and/or may be installed elsewhere within a rack housing the chassis 100, such as within a storage blade. In certain scenarios, such shared storage resources 155 may be accessed via a shared SAS expander 150 that is coupled to the backplane 160 of the chassis 100. The SAS expander 150 may support connections to a number of shared JBOD (Just a Bunch Of Disks) storage drives 155 that may be configured and managed individually and without implementing data redundancy across the various drives 155. The additional shared storage resources 155 may also be at various other locations within a datacenter in which chassis 100 is installed. Such additional shared storage resources 155 may also be remotely located. In some embodiments, a SAS expander 150 and storage drives 155 may be uniquely identified based on a code or other identifier that may be permanently encoded in a non-volatile memory of the SAS expander 150 or storage drive 155 by its respective manufacturer. In instances where SAS expander 150 and storage drives 155 are factory installed, as described below, embodiments may support validation of SAS expander 150 and storage drives 155 as being the same SAS expander and storage drives that were installed at the factory during the manufacture of chassis 100. As described in additional detail below, embodiments may further support secure validation of the movement, addition or removal of these shared SAS expander 150 and/or individual storage drives 155 from one chassis 100 to another that is also configured according to embodiments. As described in additional detail below, embodiments further support secure validation of the movement of replaceable hardware components, such as storage drives 155, between the members of a computing cluster, such as clusters formed from logically and/or physically linking IHSs (e.g., compute sleds 105*a-n* and/or storage sleds 115*a-n*) installed in one or more chassis 100.

As illustrated, chassis 100 also includes one or more storage sleds 115*a-n* that are coupled to the backplane 160 and installed within one or more bays of chassis 200 in a similar manner to compute sleds 105*a-n*. Each of the individual storage sleds 115*a-n* may include various different numbers and types of storage devices. For instance, storage sleds 115*a-n* may include SAS (Serial Attached SCSI) magnetic disk drives, SATA (Serial Advanced Technology Attachment) magnetic disk drives, solid-state drives (SSDs) and other types of storage drives in various combinations. The storage sleds 115*a-n* may be utilized in various storage configurations by the compute sleds 105*a-n* that are coupled to chassis 100. As illustrated, each storage sled 115*a-n* includes a remote access controller (RAC) 120*a-n* provides capabilities for remote monitoring and management of respective storage sleds 115*a-n*. In some embodiments, each storage sled 115*a-n* may be uniquely identified based on a code or other identifier that may be permanently encoded in a non-volatile memory of the respective storage sled 115*a-n* by its manufacturer. As described below, embodiments support validation of each storage sled 115*a-n* as being a storage sled that was installed at the factory during the manufacture of chassis 100. As described in additional detail below, embodiments further support secure validation of the movement of replaceable hardware components between the members of a computing cluster, such as clusters formed from logically and/or physically linking multiple storage sleds 115*a-n* installed in one or more chassis 100.

As illustrated, the chassis 100 of FIG. 1 includes a shared network controller 140 that provides network access to the sleds 105*a-n*, 115*a-n* installed within the chassis. Network controller 140 may include various switches, adapters, controllers and couplings used to connect chassis 100 to a network, either directly or via additional networking components and connections provided via a rack in which chassis 100 is installed. Each of the IHSs (e.g., compute sleds 105*a-n* and storage sleds 115*a-n*) installed in chassis 100 may utilize network bandwidth provided by shared network controller 140. In some embodiments, a network controller 140 may be uniquely identified based on a code or other identifier that may be permanently encoded in a non-volatile memory of the network controller 140 by its manufacturer. As described below, embodiments support validation of network controller 140 as being the same network controller that was installed at the factory during the manufacture of chassis 100.

Chassis 100 may similarly include one or more shared power supply units 135 that provides the components of the chassis with various levels of DC power from an AC power source or from power delivered via a power system provided by a rack within which chassis 100 may be installed. In certain embodiments, power supply unit 135 may be implemented within a shared sled that may provide chassis 100 with multiple redundant, hot-swappable power supply units. Each of the IHSs (e.g., compute sleds 105*a-n* and storage sleds 115*a-n*) installed in chassis 100 may utilize power provided by shared power supply units 135. In some embodiments, a power supply unit 135 may be uniquely identified based on a code or other identifier that may be permanently encoded in a non-volatile memory of the power supply unit 135 by its manufacturer. As described below, embodiments support validation of power supply unit 135 as being the same power supply unit that was installed at the factory during the manufacture of chassis 100.

Chassis 100 may also include various shared I/O controllers 140 that may support various shared I/O ports, such as shared USB ports that may be used to support keyboard and mouse inputs and/or video display capabilities. Such shared I/O controllers 145 may be utilized by the chassis management controller 125 to support various KVM (Keyboard, Video and Mouse) 125*a* capabilities that provide administrators with the ability to interface with the chassis 100. In some embodiments, each I/O controller 140 may be uniquely identified based on a code or other identifier that may be permanently encoded in a non-volatile memory of the respective I/O controller 140 by its manufacturer. As described below, embodiments support validation of I/O controllers 140 as being the same I/O controllers that were installed at the factory during the manufacture of chassis 100.

The chassis management controller 125 may also include a storage module 125*c* that provides capabilities for managing and configuring certain aspects of the storage devices of chassis 100, such as the storage devices provided within storage sleds 115*a-n* and within the JBOD 155. In some embodiments, a chassis management controller 125 may be uniquely identified based on a code or other identifier that may be permanently encoded in a non-volatile memory of the chassis management controller 125 by its manufacturer. As described below, embodiments support validation of chassis management controller 125 as being the same chassis management controller that was installed at the factory during the manufacture of chassis 100.

In addition to providing support for KVM 125*a* capabilities for administering chassis 100, chassis management controller 125 may support various additional functions for sharing the infrastructure resources of chassis 100. In some scenarios, chassis management controller 125 may implement tools for managing the shared power 135, network bandwidth 140 and airflow cooling 130 that are available via the chassis 100. As described, the airflow cooling 130 utilized by chassis 100 may include a shared airflow cooling system that is provided by a rack in which the chassis 100 may be installed and managed by a cooling module 125*b* of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

Figure 2A:
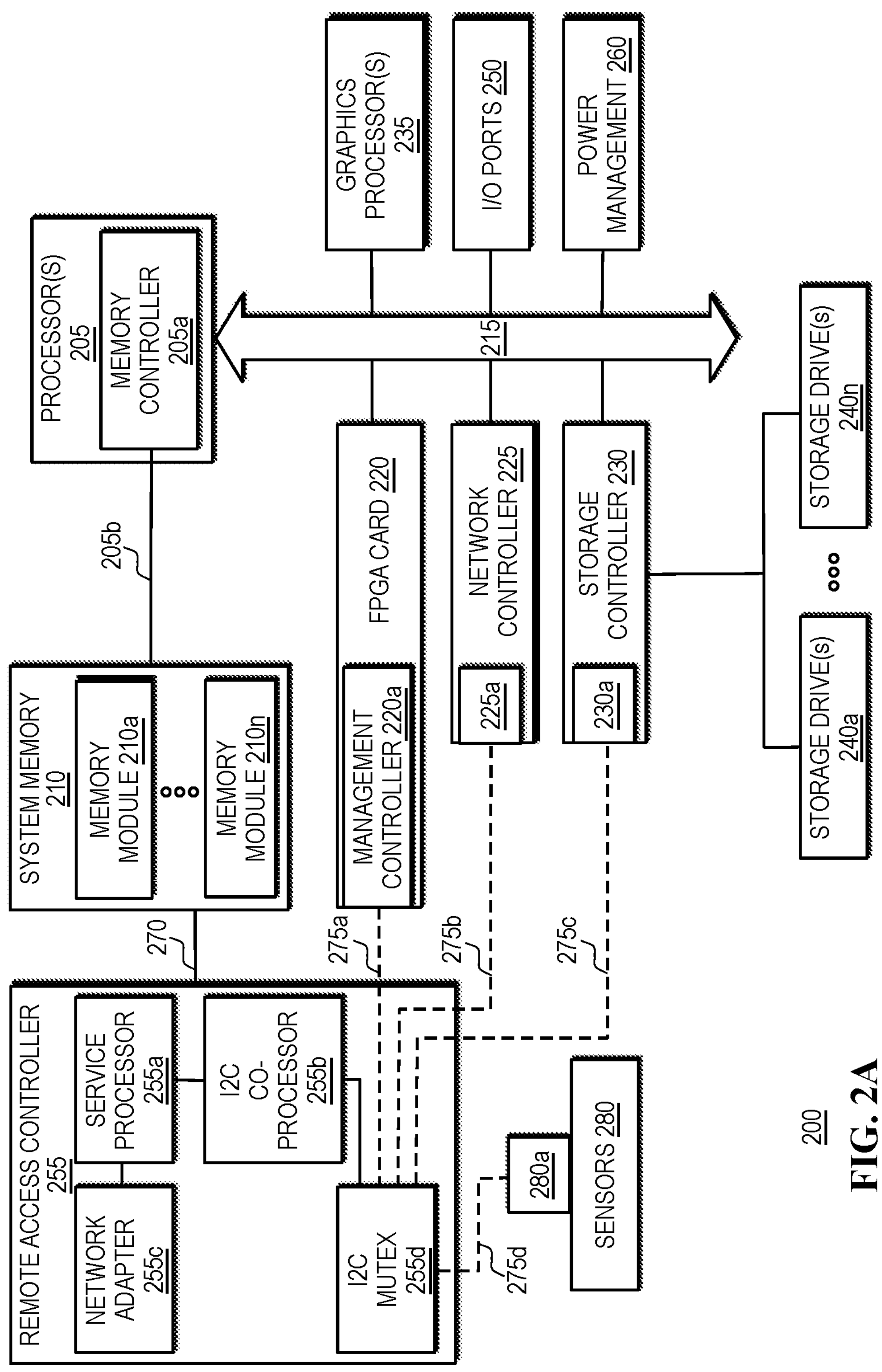
FIG. 2A is a diagram illustrating certain components of an IHS configured, according to some embodiments, for supporting validated transfer of replaceable hardware components within a cluster of multiple IHSs.

FIG. 2A shows an example of an IHS 200 configured to implement systems and methods described herein for supporting the validated transfer of replaceable hardware components within a computer cluster that is formed by physically and/or logically linking multiple IHSs 200. It should be appreciated that although the embodiments described herein may describe an IHS that is a compute sled or similar computing component that may be deployed within the bays of a chassis, other embodiments may be utilized with other types of IHSs that may also support validation of the secure assembly and delivery of the IHS 200, and further support validation of the movement of replaceable hardware components within a computing cluster. In the illustrative embodiment of FIG. 2A, IHS 200 may be a computing component, such as compute sled 105*a-n* or other type of server, such as an 1RU server installed within a 2RU chassis, that is configured to share infrastructure resources provided by a chassis 100.

As described, an IHS 200 may be assembled and provisioned according to customized specifications provided by a customer. The IHS 200 of FIG. 2A may be a compute sled, such as compute sleds 105*a-n* of FIG. 1, that may be installed within a chassis, that may in turn be installed within a rack. Installed in this manner, IHS 200 may utilize shared resources, such as power 135, network 140 and cooling 130 resources, provided by the chassis 100. Embodiments of IHS 200 may include a wide variety of different hardware configurations. Such variations in hardware configuration may result from IHS 200 being factory assembled to include components specified by a customer that has contracted for manufacture and delivery of IHS 200. As described in additional detail below, IHS 200 may include capabilities that allow a customer to validate that the hardware components of IHS 200 are the same hardware components that were installed at the factory during its manufacture, and further include capabilities supporting validated transfer of replaceable hardware components within a computing cluster that is formed by physically and/or logically linking multiple IHSs 200.

As described in additional detail below, IHS 200 may include capabilities that allow a customer to validate that the hardware that is detected as installed by IHS 200 is the same factory installed and provisioned hardware that was supplied to the customer. IHS 200 may include various replaceable hardware components that may be occasionally added or removed from the IHS by an administrator. Embodiments additionally support secure validation of the movement of such replaceable hardware components between the members of a computing cluster, such as clusters formed from logically and/or physically linking multiple IHSs 200.

IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications. In some embodiments, each of the processors 205 may be uniquely identified based on a code or other identifier that may be permanently encoded in a respective processor 205 by its manufacturer. As described below, embodiments support validation of processors 205 as being the same processors that were installed at the factory during the manufacture of IHS 200.

As illustrated, processor(s) 205 includes an integrated memory controller 205*a* that may be implemented directly within the circuitry of the processor 205, or the memory controller 205*a* may be a separate integrated circuit that is located on the same die as the processor 205. The memory controller 205*a* may be configured to manage the transfer of data to and from the system memory 210 of the IHS 205 via a high-speed memory interface 205*b*. The system memory 210 is coupled to processor(s) 205 via a memory bus 205*b* that provides the processor(s) 205 with high-speed memory used in the execution of computer program instructions by the processor(s) 205. Accordingly, system memory 210 may include memory components, such as static RAM (SRAM), dynamic RAM (DRAM), NAND Flash memory, suitable for supporting high-speed memory operations by the processor (s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210*a-n*. Each of the removable memory modules 210*a-n* may correspond to a printed circuit board memory socket that receives a removable memory module 210*a-n*, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory. In some embodiments, each of the memory modules 210*a-n* may be uniquely identified based on a code or other identifier that may be permanently encoded in a respective memory module 210*a-n* by its manufacturer. As described below, embodiments support validation of memory modules 210*a-n* as being the same memory modules that were installed at the factory during the manufacture of IHS 200. In some embodiments, memory modules 210*a-n* may be designated as replaceable components that can be securely transferred between members of a computing cluster that includes multiple IHSs 200.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources and/or other peripheral components.

As illustrated, IHS 200 may include one or more FPGA (Field-Programmable Gate Array) cards 220. Each of the FPGA card 220 supported by IHS 200 may include various processing and memory resources, in addition to an FPGA logic unit that may include circuits that can be reconfigured after deployment of IHS 200 through programming functions supported by the FPGA card 220. Through such reprogramming of such logic units, each individual FPGA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units, each of which may be separately programmed to implement different computing operations, such as in computing different operations that are being offloaded from processor 205. The FPGA card 220 may also include a management controller 220*a* that may support interoperation with the remote access controller 255 via a sideband device management bus 275*a*. In some embodiments, each of the FPGA cards 220 installed in IHS 200 may be uniquely identified based on a code or other identifier that may be permanently encoded in the FPGA card 220 by its manufacturer. As described below, embodiments support validation of FPGA card 220 as being the same FPGA card that was installed at the factory during the manufacture of IHS 200.

Processor(s) 205 may also be coupled to a network controller 225 via in-band bus 215, such as provided by a Network Interface Controller (NIC) that allows the IHS 200 to communicate via an external network, such as the Internet or a LAN. In some embodiments, network controller 225 may be a replaceable expansion card or adapter that is coupled to a motherboard connector of IHS 200. In some embodiments, network controller 225 may be an integrated component of IHS 200. In some embodiments, network controller 225 may be uniquely identified based on a code or other identifier, such as a MAC address, that may be permanently encoded in a non-volatile memory of network controller 225 by its manufacturer. As described below, embodiments support validation of network controller 225 as being the same network controller that was installed at the factory during the manufacture of IHS 200. In some embodiments, network controller 225 may be installed within an accessible bay of IHS 200 and may be designated as a replaceable component that can be securely transferred between members of a computing cluster that includes multiple IHSs 200.

IHS 200 may include one or more storage controllers 230 that may be utilized to access storage drives 240*a-n* that are accessible via the chassis in which IHS 100 is installed. Storage controller 230 may provide support for RAID (Redundant Array of Independent Disks) configurations of logical and physical storage drives 240*a-n*. In some embodiments, storage controller 230 may be an HBA (Host Bus Adapter) that provide more limited capabilities in accessing physical storage drives 240*a-n*. In some embodiments, storage drives 240*a-n* may be replaceable, hot-swappable storage devices that are installed within bays provided by the chassis in which IHS 200 is installed. In embodiments where storage drives 240*a-n* are hot-swappable devices that are received by bays of chassis, the storage drives 240*a-n* may be coupled to IHS 200 via couplings between the bays of the chassis and a midplane of IHS 200. In some embodiments storage drives 240*a-n* may also be accessed by other IHSs that are also installed within the same chassis as IHS 100. Storage drives 240*a-n* may include SAS (Serial Attached SCSI) magnetic disk drives, SATA (Serial Advanced Technology Attachment) magnetic disk drives, solid-state drives (SSDs) and other types of storage drives in various combinations.

In some embodiments, each individual storage controller 230 and storage drive 240*a-n* may be uniquely identified based on a code or other identifier that may be permanently encoded in a non-volatile memory of the component by its manufacturer. As described below, embodiments support validation of storage controller 230 and storage drives 240*a-n* as being the same storage controller and storage drives that were installed at the factory during the manufacture of IHS 200. In some embodiments, some or all of storage drives 240*a-n* may be designated during factory provisioning of IHS 200 as replaceable hardware components of the IHS. As designated replaceable hardware components, some embodiments may further support secure transfer of storage drives 240*a-n* between members of a computing cluster that includes multiple IHSs 200.

A variety of additional components may be coupled to processor(s) 205 via in-band bus 215. For instance, processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255. In some embodiments, components such as power management unit 260 and graphics processor 235 may also be uniquely identified based on a code or other identifier that may be permanently encoded in a non-volatile memory of these components by their respective manufacturer. As described below, embodiments support validation of these components as being components that were installed at the factory during the manufacture of IHS 200.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255. As described in additional detail below, in some embodiments, BIOS may be configured to identify hardware components that are detected as being currently installed in IHS 200. In such instances, the BIOS may support queries that provide the described unique identifiers that have been associated with each of these detected hardware components by their respective manufacturers.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 255 that supports remote management of IHS 200 and of various internal components of IHS 200. In certain embodiments, remote access controller 255 may operate from a different power plane from the processors 205 and other components of IHS 200, thus allowing the remote access controller 255 to operate, and management tasks to proceed, while the processing cores of IHS 200 are powered off.

For instance, during such intervals where the processing cores of IHS 200 are powered off, remote access controller 255 may interface with the chassis management controller 125 of the chassis 100 in which IHS 200 is installed. For instance, remote access controller 255 may utilize out-of-band signaling pathways supported by chassis 100, such as via signaling pathways of a coupling supported by the connector used to attach IHS 200 to chassis 100, where out-of-band signaling may be implemented though connections separate from those supported by the backplane 160 of chassis 100, as illustrated in FIG. 1.

As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the operating system of IHS 200 (i.e., in a bare-metal state). In some embodiments, certain operations of the remote access controller 225, such as the described inventory certificate generation and validation operations, may operate using validated instructions, and thus within the root of trust of IHS 200.

In some embodiments, remote access controller 255 may be uniquely identified based on a code or other identifier that may be permanently encoded in a non-volatile memory of the remote access controller 255 by its manufacturer. As described below, embodiments support validation of remote access controller 255 as being the same controller that was installed at the factory during the manufacture of IHS 200. Also as described below, during a provisioning phase of the factory assembly of IHS 200, a signed certificate that specifies factory installed hardware components of IHS 200 that were installed during manufacture of the IHS 200 may be stored in a non-volatile memory that is accessed by remote access controller 255. Using this signed inventory certificate stored by the remote access controller 255, a customer may validate that the detected hardware components of IHS 200 are the same hardware components that were installed at the factory during manufacture of IHS 200. As described in additional detail below, this factory-provisioned inventory certificate may be supplemented by a delta certificate that is used in validating modifications to the factory-installed hardware of an IHS 200. In embodiments, this delta certificate may be generated in a manner that provides validated transfer of replaceable hardware components between the IHSs 200 that are members of a computing cluster.

In some embodiments, remote access controller 255 may support secure connections with remote management tools that provides administrators with various capabilities for remotely administering the operation of an IHS, including initiating updates to the software and hardware installed in the IHS 200. For example, a remote management tools may interface with remote access controller 255 in providing capabilities by which an administrator can initiate updates to the firmware utilized by some or all of the storage drives 240*a-n* installed in the IHS. The remote management tools may also include various monitoring interfaces for evaluating telemetry data collected by the remote access controller 255. In some embodiments, remote management tools may communicate with remote access controller 255 via a protocol such the Redfish.

As described, IHS 200 may be logically and/or physical linked to other IHSs in order to form computing clusters that may be accessed as a single system that relies on the collective computing and storage capabilities of the IHSs that are used to form the cluster. In some embodiments, administration of computing clusters that includes IHSs 200 installed within one or more chassis of a datacenter may be conducted using remote management tools that are supported by remote access controller 255. Using remote management tools, an administrator may configure a group of IHSs for operating as a computing cluster that can be collectively tasked. As described in additional detail below, remote access controller 255 may interface with remote management tools in the generation of delta certificates for use in validating the transfer of replaceable hardware components between the IHSs that form the computing cluster.

In support of the capabilities for validating the detected hardware components of IHS 200 against the inventory information that is specified in a signed inventory certificate, remote access controller 255 may support various cryptographic capabilities. For instance, remote access controller 255 may include capabilities for key generation such that remote access controller may generate keypairs that include a public key and a corresponding private key. As described in additional detail below, using generated keypairs, remote access controller 255 may digitally sign inventory information collected during the factory assembly of IHS 200 such that the integrity of this signed inventory information may be validated at a later time using the public key by a customer that has purchased IHS 200. Using these cryptographic capabilities of the remote access controller, the factory installed inventory information that is included in an inventory certificate may be anchored to a specific remote access controller 255, since the keypair used to sign the inventory information is signed using the private key that is generated and maintained by the remote access controller 255.

In some embodiment, the cryptographic capabilities of remote access controller 255 may also include safeguards for encrypting any private keys that are generated by the remote access controller and further anchoring them to components within the root of trust of IHS 200. For instance, a remote access controller 255 may include capabilities for accessing hardware root key (HRK) capabilities of IHS 200, such as for encrypting the private key of the keypair generated by the remote access controller. In some embodiments, the HRK may include a root key that is programmed into a fuse bank, or other immutable memory such as one-time programmable registers, during factory provisioning of IHS 200. The root key may be provided by a factory certificate authority, such as described below. By encrypting a private key using the hardware root key of IHS 200, the hardware inventory information that is signed using this private key is further anchored to the root of trust of IHS 200. If a root of trust cannot be established through validation of the remote access controller cryptographic functions that are used to access the hardware root key, the private key used to sign inventory information cannot be retrieved. In some embodiments, the private key that is encrypted by the remote access controller using the HRK may be stored to a replay protected memory block (RPMB) that is accessed using security protocols that require all commands accessing the RPMB to be digitally signed using a symmetric key and that include a nonce or other such value that prevents use of commands in replay attacks. Stored to an RPMG, the encrypted private key can only be retrieved by a component within the root of trust of IHS 200, such as the remote access controller 255.

Remote access controller 255 may include a service processor 255*a*, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225*c* may support connections with remote access controller 255 using wired and/or wireless network connections via a variety of network technologies.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275*a-d* that may be individually established with each of the respective managed devices 220, 225, 230, 280 through the operation of an I2C multiplexer 255*d* of the remote access controller. As illustrated, certain of the managed devices of IHS 200, such as non-standard hardware 220, network controller 225 and storage controller 230, are coupled to the IHS processor(s) 205 via an in-line bus 215, such as a PCIe root complex, that is separate from the I2C sideband bus connections 275*a-d* used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255*a* of remote access controller 255 may rely on an I2C co-processor 255*b* to implement sideband I2C communications between the remote access controller 255 and managed components 220, 225, 230, 280 of the IHS. The I2C co-processor 255*b* may be a specialized co-processor or micro-controller that is configured to interface via a sideband I2C bus interface with the managed hardware components 220, 225, 230, 280 of IHS. In some embodiments, the I2C co-processor 255*b* may be an integrated component of the service processor 255*a*, such as a peripheral system-on-chip feature that may be provided by the service processor 255*a*. Each I2C bus 275*a-d* is illustrated as single line in FIG. 2. However, each I2C bus 275*a-d* may be comprised of a clock line and data line that couple the remote access controller 255 to I2C endpoints 220*a*, 225*a*, 230*a*, 280*a* which may be referred to as modular field replaceable units (FRUs).

As illustrated, the I2C co-processor 255*b* may interface with the individual managed devices 220, 225, 230, 280 via individual sideband I2C buses 275*a-d* selected through the operation of an I2C multiplexer 255*d*. Via switching operations by the I2C multiplexer 255*d*, a sideband bus connection 275*a-d* may be established by a direct coupling between the I2C co-processor 255*b* and an individual managed device 220, 225, 230, 280. In providing sideband management capabilities, the I2C co-processor 255*b* may each interoperate with corresponding endpoint I2C controllers 220*a*, 225*a*, 230*a*, 280*a* that implement the I2C communications of the respective managed devices 220, 225, 230. The endpoint I2C controllers 220*a*, 225*a*, 230*a*, 280*a* may be implemented as a dedicated microcontroller for communicating sideband I2C messages with the remote access controller 255, or endpoint I2C controllers 220*a*, 225*a*, 230*a*, 280*a* may be integrated SoC functions of a processor of the respective managed device endpoints 220, 225, 230, 280.

In various embodiments, an IHS 200 does not include each of the components shown in FIG. 2A. In various embodiments, an IHS 200 may include various additional components in addition to those that are shown in FIG. 2A. Furthermore, some components that are represented as separate components in FIG. 2A may in certain embodiments instead be integrated with other components. For example, in certain embodiments, all or a portion of the functionality provided by the illustrated components may instead be provided by components integrated into the one or more processor(s) 205 as a systems-on-a-chip.

Figure 2B:
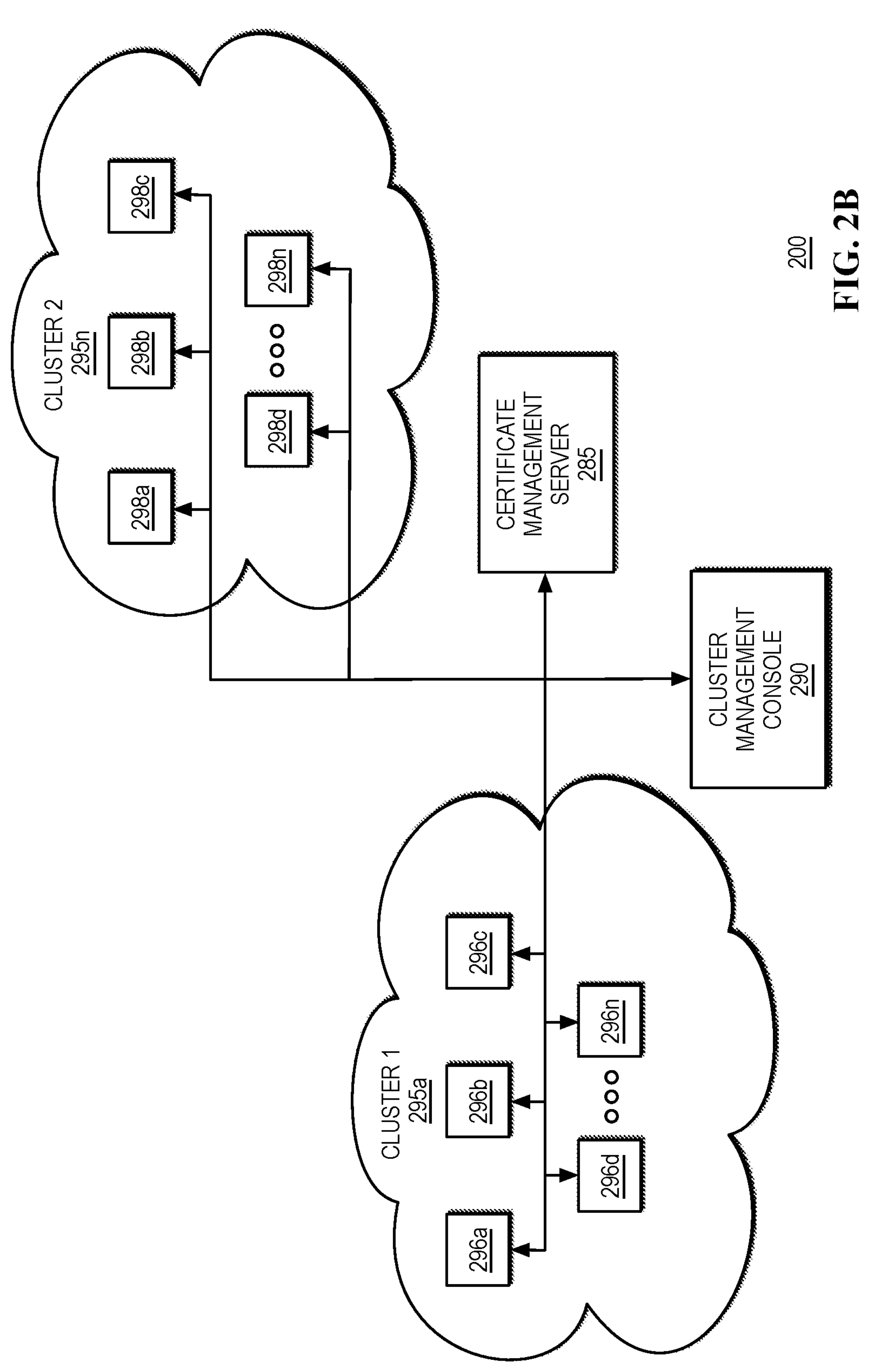
FIG. 2B is a diagram illustrating certain components of a cluster of IHSs configured according to some embodiments.

FIG. 2B is a diagram illustrating certain components of a computing cluster of IHSs configured according to some embodiments. In FIG. 2B, two computing clusters 295*a-n* are illustrated, each comprised of a group of IHSs 296*a-n*, 298*a-n*, where each IHS may be a rack-mounted server or other IHS described with regard to FIG. 2A. Although only two clusters are illustrated, any number of clusters may be supported by embodiments. Each computing cluster 295*a-n* may be separate tasked with computing tasks, where each individual cluster may be tasked as a unitary system. For instance, cluster 295*a* is formed from a set of IHSs 296*a-n*, such as in implementing a cloud-based data storage system that distributes data among the member of the cluster, or in implementing an AI computing cluster that distributes calculations of the AI system across the members of the cluster. In such scenarios, the cluster 295*a* may be tasked as a single system, without knowledge of any of the individual IHSs 296*a-n* that form the cluster.

The cluster may be formed and administered using a cluster management console 290 that may be one of the remote management tools, described above with regard to FIG. 2A, using in the administration of a data center. In some embodiments, cluster management console 290 may be used in building each of the clusters 295*a-n*, such as assigning and configuring each of the IHSs 296*a-n*, 298*a-n* for membership in a cluster. In some embodiments, the cluster management console 290 may be used only in the administration of the computing clusters 295*a-n*, such as in monitoring the collective resources that are available within each cluster. As described above, cluster management console 290 may interface with remote access controllers on each of the IHSs 296*a-n*, 298*a-n* in administration of the clusters 295*a-n* that are implemented using these IHSs.

In some embodiments, cluster management console 290 may receive notifications from individuals IHSs 296*a-n*, 298*a-n* of replaceable hardware components that have been detected and validated by each respective IHS. Based on these reports of validated hardware, the cluster management console 290 may generate a listing of replaceable hardware components that have been reported as validated within each of the clusters 295*a-n*. As described in additional detail below, cluster management console 290 may generate delta certificates that can be used to validate the movement of replaceable hardware components between the IHSs of an individual cluster. For instance, based on a delta certificate generated and distributed by the cluster management console 290, all of the replaceable hardware components that have been reported as validated within a cluster 295*a* may be validated by all of the IHSs 296*a-n* that are members of that cluster.

As IHSs report validated replaceable hardware components, the cluster management console 290 builds and maintains an inventory of replaceable hardware components that are known to be operating within each of the clusters 295*a-n*. Using this inventory, delta certificates may be generated that support validation of all replaceable hardware components that are known within a cluster, thus facilitating administration involving movement of these replaceable hardware components while still validating the authenticity of every hardware component that is detected. In some embodiments, cluster management console 290 may rely on a certificate management server 285 in generating delta certificates, where the certificate management server 285 may be a certificate authority that can generate delta certificates, or may interface with an external certificate authority in generating delta certificates.

Figure 3:
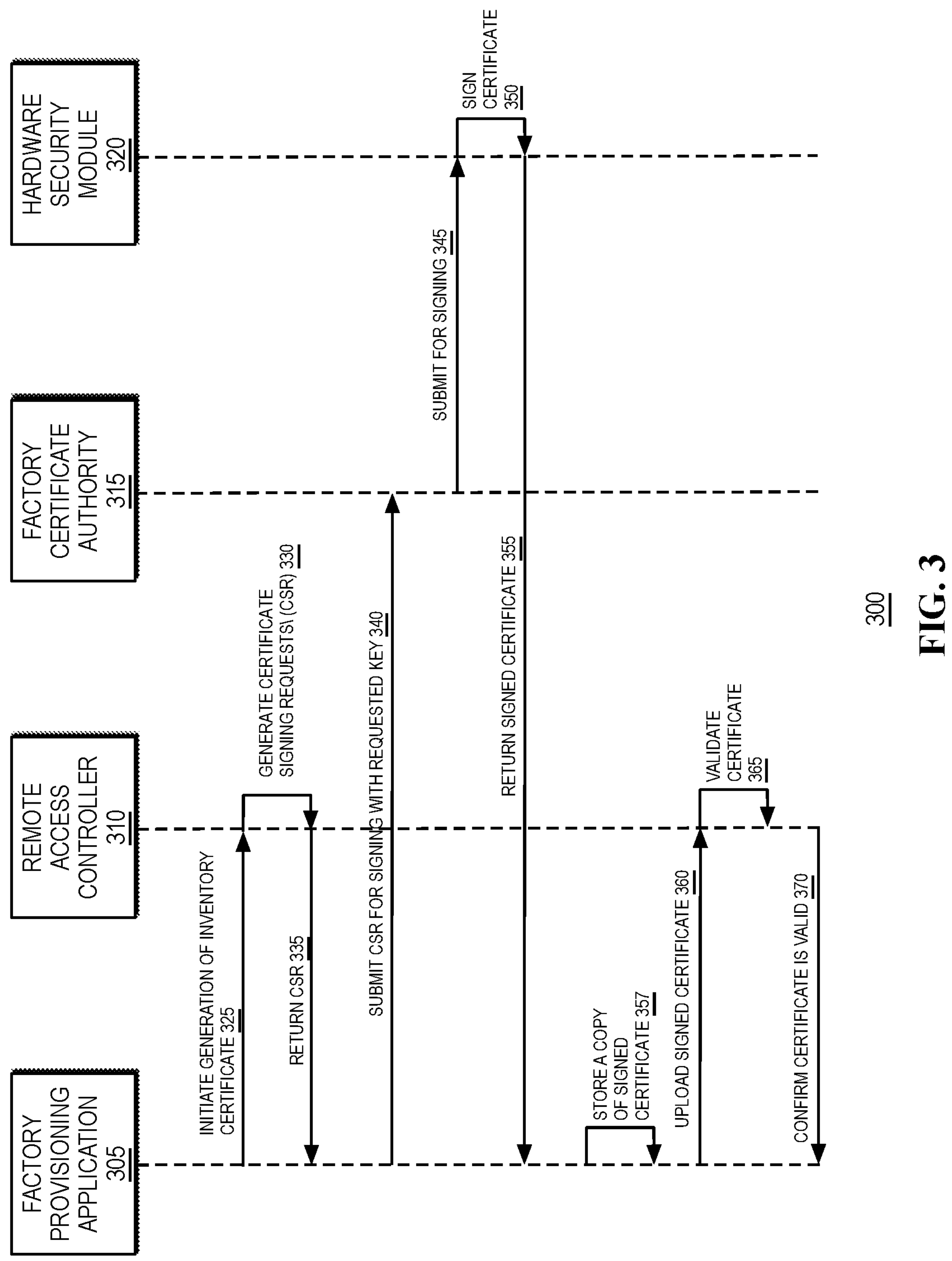
FIG. 3 is a swim lane diagram illustrating certain responsibilities of components of a system configured according to certain embodiments for factory provisioning of an IHS in a manner that supports validated transfer of replaceable hardware components within a cluster of IHSs.
Figure 4:
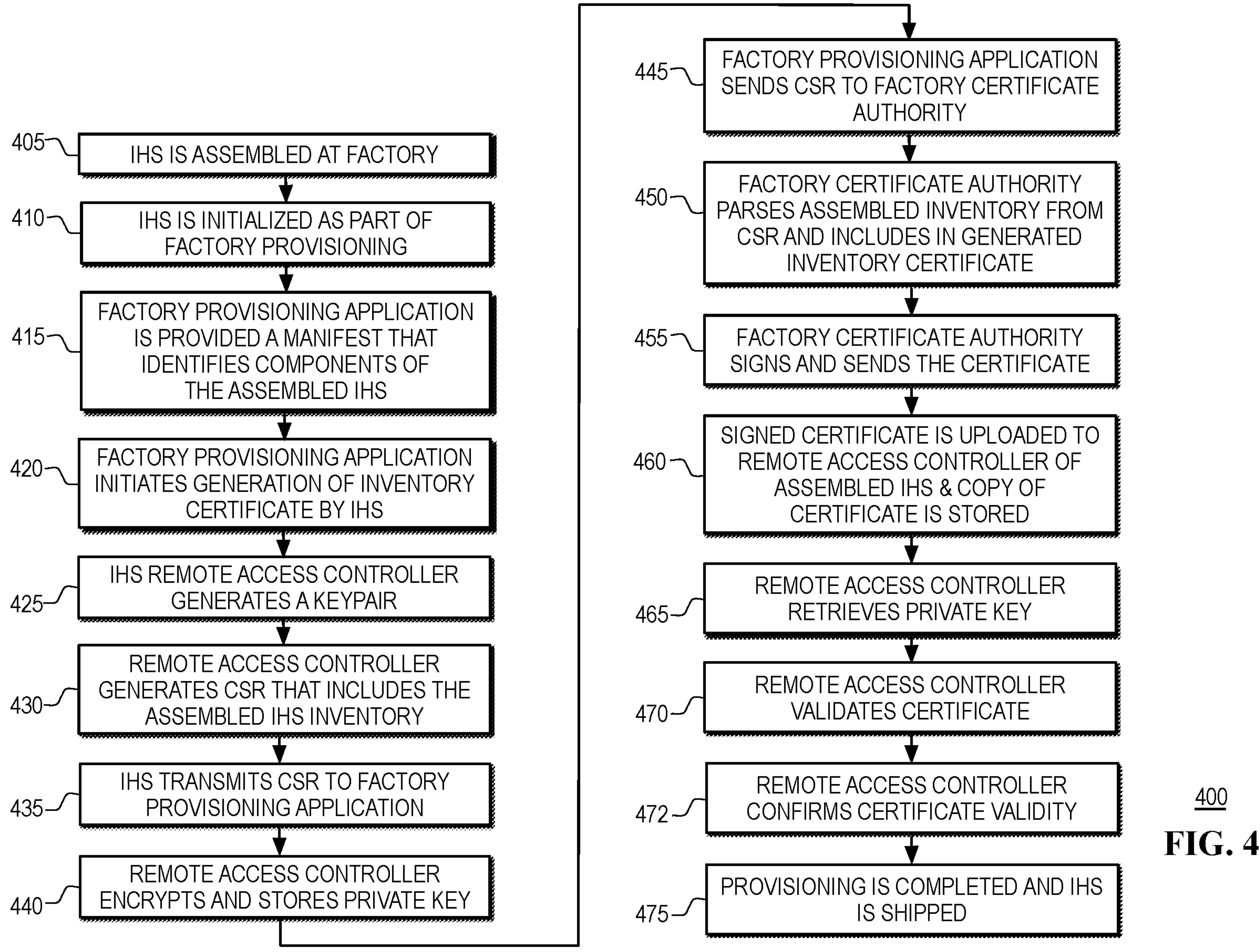
FIG. 4 is a flowchart describing certain steps of a method, according to some embodiments, for assembly and provisioning of an IHS in a manner that supports validated transfer of replaceable hardware components within a cluster of IHSs.

FIG. 3 is a swim lane diagram illustrating certain responsibilities of components of a system configured according to certain embodiments for factory provisioning of an IHS in a manner that supports validated transfer of replaceable hardware components within a cluster of multiple IHSs. FIGS. 4A-B are a flowchart describing certain steps of a method, according to some embodiments, for factory provisioning of an IHS in a manner that supports validated transfer of replaceable hardware components within a cluster of multiple IHSs.

Some embodiments of the method of FIGS. 4A-B may begin, at block 405, with the factory assembly of an IHS, such as the assembly of a server described with regard to FIGS. 1 and 2A-B. In some instances, an IHS may be manufactured using a factory process that includes multiple phases of assembly, validation and provisioning that must be completed before the IHS is supplied to a customer. As described, an IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a manifest that tracks the individual hardware components that are installed in an IHS or chassis. As described above, the installed hardware components may include standard components and may also include specialized components that have been requested by a specific customer that has contracted for the assembly and delivery of an IHS that is installed in a chassis.

Once the assembly of an IHS has been completed and installed in a chassis, the IHS may be subjected to manual and automated inspections that confirm the IHS has been properly assembled and does not include any defects. After confirming an IHS has been assembled without any manufacturing defects, at block 410, factory provisioning of the IHS may be initiated. In some instances, the provisioning of an IHS at the factory may include various stages that may include stages for loading of firmware, configuring hardware components, and installing an operating system and other software. As indicated in FIG. 3, various aspects of this factory provisioning process may be conducted using a factory provisioning application 305, where this factory provisioning application may run on one or more servers and may interface with an IHS that is being provisioned once a requisite amount of firmware and software has been installed to the IHS.

As described, a manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. In some embodiments, the manifest may identify some of the hardware components installed in the IHS as replaceable hardware, such as memory modules 210*a-n* and storage drives 240*a-n*. As described below, these components that are designated as replaceable hardware may be transferred within the members of a computer cluster that is formed from physically and/or logically linking multiple IHSs 200. At block 415, a manifest generated during assembly of an IHS is provided to the factory provisioning application 305 that is being used to provision the assembled IHS.

Based on this manifest of IHS hardware and replaceable hardware information, at block 420, the factory provisioning application 305 may initiate the generation of an inventory certificate that may be used to validate that the detected hardware components of the IHS are the same hardware components that were installed during the factory assembly of the IHS. In embodiments, the validation of the IHS hardware as factory installed using the inventory certification may be extended through the use of a delta certificate that can be used to validated specific modifications to the hardware components. In a computing cluster, replaceable hardware components may be regularly moved between the IHSs that are used to implement the cluster. Accordingly, in embodiments, the factory-provisioned inventory certificate may be augmented with a delta certificate for use in validating all known replaceable hardware components currently installed within a computing cluster, thus support secure transfer of these components between the IHSs that are used to form the cluster.

As described with regard to FIGS. 1 and 2A, an IHS may include a remote access controller that provides capabilities for remote management of an IHS, where these remote management capabilities may include sideband management of various hardware components of an IHS, and sideband communications with a chassis management controller of the chassis in which the IHS is installed. As indicated in FIG. 3, the generation of an inventory certificate for a newly assembled IHS, at 325, may be initiated via a request from the factory provisioning application 305 to the remote access controller 310 of the IHS. As described with regard to FIG. 2A, a remote access controller of an IHS may include cryptographic capabilities that operate within the root of trust of the IHS and that include the ability to generate cryptographic keypairs. Utilizing such cryptographic capabilities, at block 425, the remote access controller 310 initiates the generation of an inventory certificate by generating a cryptographic key pair for use in validating the authenticity of inventory information that is included in an inventory certificate.

At block 430 and at 330, the remote access controller 310 generates a certificate signing request (CSR) for a digital identity certificate, where the request specifies the public key of the key pair generated by the remote access controller and also specifies the factory installed hardware inventory from the manifest that was generated during assembly of the IHS, and also specifies an inventory of these factory-installed hardware components that are replaceable hardware components. The factory installed hardware and shared hardware inventory information included in the CSR may be signed by the remote access controller using the private key from the generated keypair. At block 435 and at 335, the CSR for the requested inventory certificate is transmitted to the factory provisioning application 305 by the remote access controller 310. At block 440, the remote access controller safeguards the private key from the generated key pair. In some embodiments, the remote access controller may encrypt the private key using the hardware root key (HRK) of the IHS and may store the encrypted key to a protected memory, such as the replay protected memory block that is described with regard to FIG. 2.

Upon receiving the certificate signing request from the remote access controller 310, at block 445 and at 340, the factory provisioning application 305 submits the CSR for signing by a factory certificate authority 315. In some embodiments, the factory provisioning application 305 specifies a factory key to be used by the factory certificate authority 315 in signing the inventory certificate. For instance, the factory provisioning application may include the name of a trusted certificate associated with a factory key as an attribute of the CSR that is transmitted to the factory certificate authority 315. Upon receipt of the CSR, at block 450, the factory certificate authority parses from the CSR: the hardware inventory information, any replaceable hardware inventory information, the public key generated by the remote access controller and the information specifying the requested signing key. Based on the information parsed from the CSR, the factory certificate authority generates a digital identity certificate, referred to herein as an inventory certificate, that is associated with the public key provided by the remote access controller and that specifies the factory installed hardware inventory of the IHS, and may also specifies replaceable hardware of the IHS.

As indicated in FIG. 3, at 345, the factory certificate authority 315 submits the generated inventory certificate for signing by a hardware security module 320 that may be a dedicated hardware component of a factory provisioning server that safeguards cryptographic keys and implements cryptographic functions utilized in the factory provisioning process. In some embodiments, the factory certificate authority 315 may also specify a certificate name associated with a signing key that is maintained by the hardware security module 320. At 350, the hardware security module 320 utilizes the private key associated with the specified certificate in order to digitally sign the submitted inventory certificate, which includes the inventory of the factory installed hardware components of the IHS and the inventory of replaceable hardware of the IHS. The signed inventory certificate is then returned to the factory certificate authority 315 by the hardware security module 320.

Once the inventory certificate has been signed, at block 460 and at 355, the signed inventory certificate is transmitted from the factory certificate authority 315 to the factory provisioning application 305. As indicated in FIG. 3 at 357, the factory provisioning application 305 may store a copy of the signed inventory certificate. In some instances, the copy may be saved to a data store utilized in providing ongoing support of the IHS once it has been shipped and has been deployed by a customer. Once the IHS has been deployed within a computing cluster, embodiments may be utilized to augment this factory-provisioned inventory certificate with one or more delta certificates that can be used in validating any of the replaceable hardware components that have been reported as currently installed in any of the IHSs 200 that are members of the computing cluster.

At block 465 and at 360, the signed inventory certificate is than loaded to the assembled IHS. As indicated in FIG. 3, in some embodiments, the signed inventory certificate may be uploaded to a remote access controller 310 of the assembled IHS, such that the signed inventory certificate may be stored to a nonvolatile memory or other persistent storage that is accessible by the remote access controller 310 independent from the operating system of the IHS. In other embodiments, the signed inventory certificate may be uploaded without reliance on the remote access controller to another non-volatile memory of the IHS.

Some embodiments may continue, at 365, with the validation of the signed inventory certificate by the remote access controller 310. Using the private key from the generated keypair, at block 470, the remote access controller decrypts the signature included by the remote access controller in the CSR and confirms that the inventory information included in the signed inventory certificate matches the inventory information that was submitted in the certificate signing request, thus validating the integrity of the generation of the signed inventory certificate. At block 472, the remote access controller confirms that the inventory included in the signed inventory certificate is valid and, at 370, the remote access controller 310 confirms the validity of the inventory certificate with a notification to the factory provisioning application 305. With the generation and validation of the signed inventory certificate completed, additional factory provisioning of the assembled IHS may be completed and, at block 490, the assembled IHS may be shipped from the factory to an individual or location designated by a customer.

Figure 5:
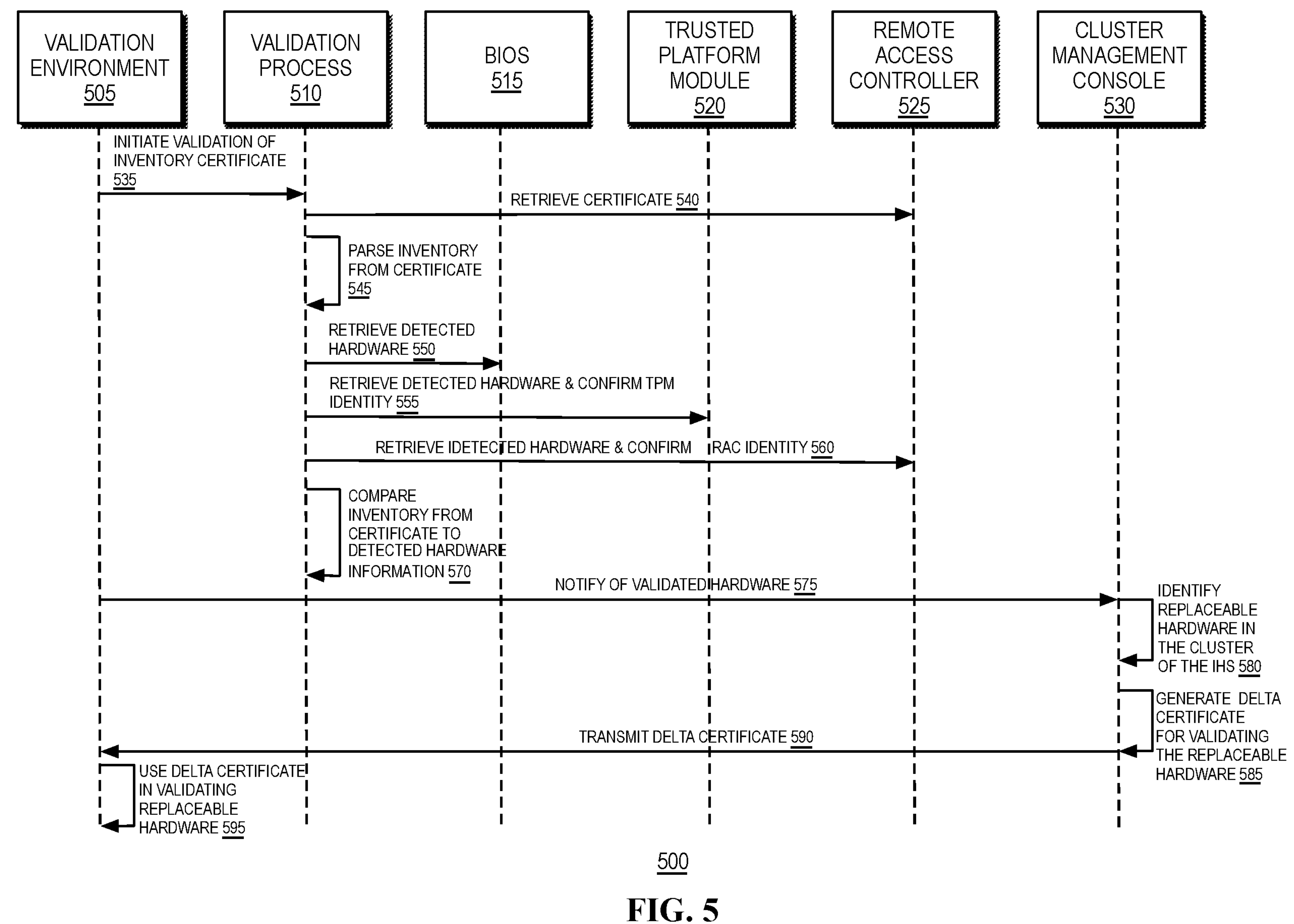
FIG. 5 is a swim lane diagram illustrating certain responsibilities of components of an system configured according to certain embodiments for validated transfer of replaceable hardware components within a cluster of IHSs.
Figure 6A:
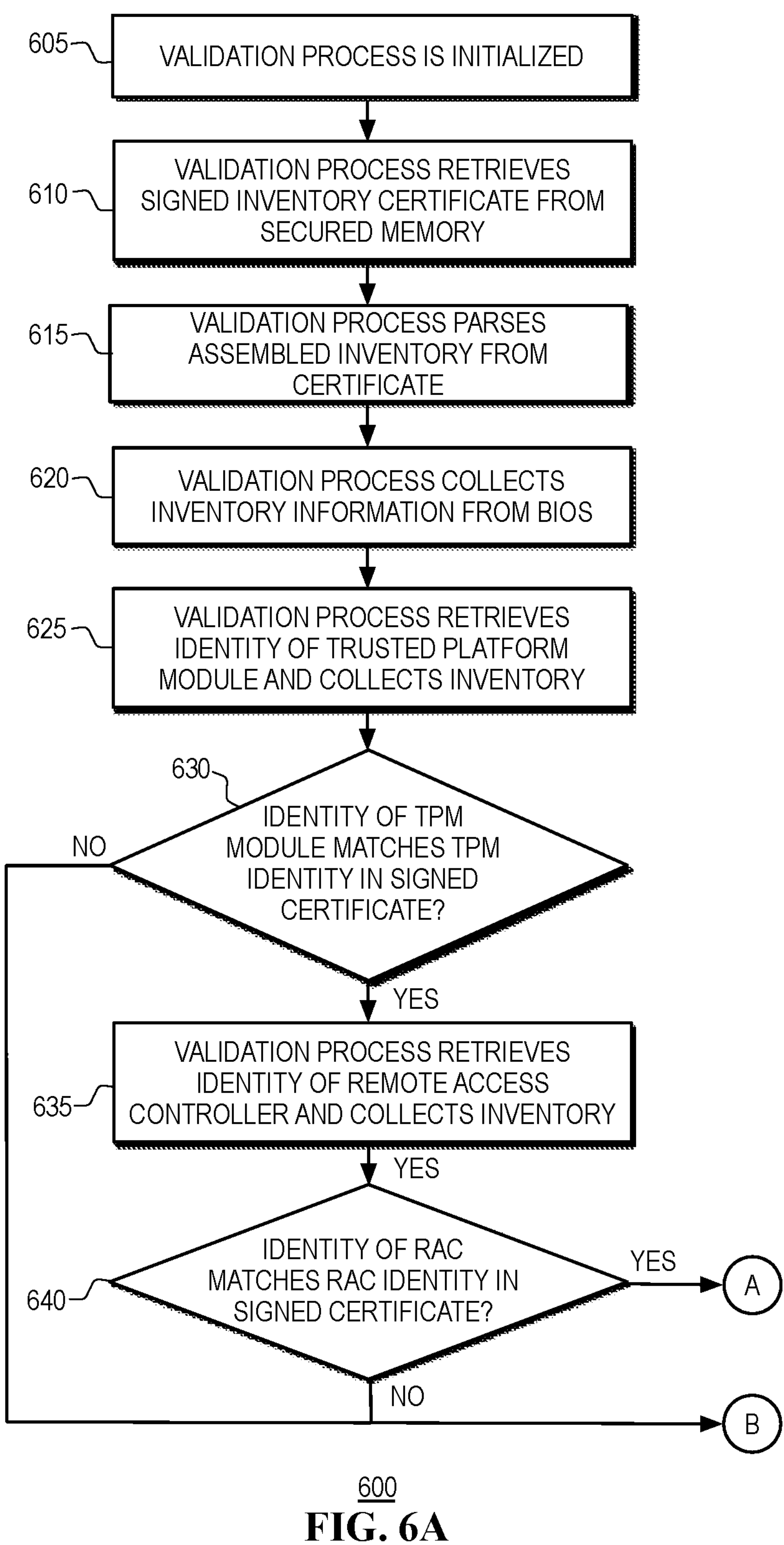
FIG. 6A is a flowchart describing certain steps of a method, according to some embodiments, for validated transfer of replaceable hardware components within a cluster of IHSs.
Figure 6B:
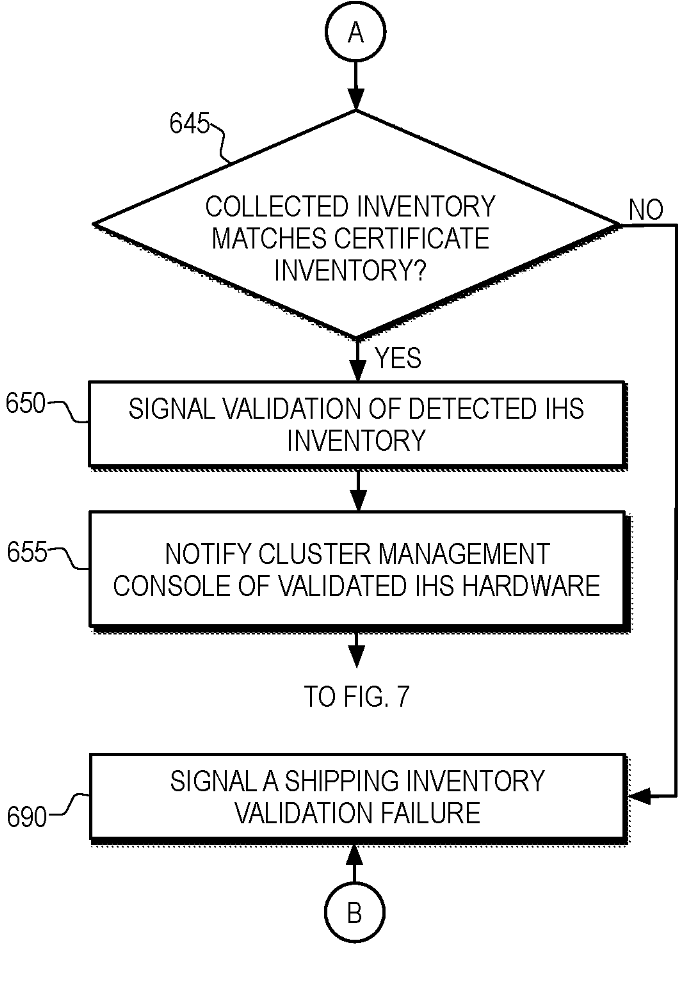
FIG. 6B is a continuation of the flowchart of FIG. 6A.

FIG. 5 is a swim lane diagram illustrating certain responsibilities of components of an IHS configured according to certain embodiments for use of an inventory certificate in the validation of the hardware components of the IHS, including the validated transfer of replaceable hardware components within a computer cluster that is formed from physically and/or logically linking multiple IHSs 200. FIG. 6 is a flowchart describing certain steps of a method, according to some embodiments, for use of an inventory certificate in the validation of the hardware components of the IHS, validated transfer of replaceable hardware components within a computer cluster that is formed from physically and/or logically linking multiple IHSs 200. Embodiments may begin with the delivery of an IHS to a location specified by a customer, where the IHS has been assembled and provisioned according to the procedures set forth above. In particular, the delivered IHS has been provisioned at the factory to include a signed inventory certificate that specifies the factory installed hardware components of the IHS, and that may specify whether any of the factory installed hardware components are replaceable hardware components.

Upon receiving an IHS configured in this manner, the IHS may be unpacked, assembled and initialized by an administrator. In some instances, an IHS may be ready for immediate deployment by a customer. In other instances, an IHS may require further provisioning by customer before it is deployed, such as for operation within a particular data center. As such, in various instances, an IHS may be unpacked, assembled and initialized in order to deploy the IHS or to prepare it for further provisioning.

At block 605, the IHS has been powered and validation process is initialized. In some instances, the validation process may be initialized as part of the initial provisioning of an IHS by a customer. In other instances, the validation process may be initialized by an administrator as part of an onboarding procedure for configuring modifications to the hardware of the IHS. In some embodiments, the validation process may run within a pre-boot environment, such as a PXE (Preboot execution Environment) operating environment. In some embodiments, a PXE operating environment in which a validation process runs may be retrieved from a network location and may thus be executed using the processing and memory capabilities of the IHS. In some embodiments, a PXE operating environment may be retrieved using secure protocols, such as HTTPS, in order to assure the integrity of the operating environment instructions that are utilized. In some embodiments, a pre-boot operating environment in which the validation process runs may include an operating environment that is executed by the remote access controller of the IHS based on validated firmware instructions. In these embodiments that utilize a pre-boot operating environment, the validation of the detected hardware components of the IHS is conducted prior to booting of the operating system of the IHS.

In some embodiments, the validation process may run as part of a diagnostic mode that is supported by an IHS. For instance, an IHS may support a diagnostic mode that may be initiated by a user or may be initiated automatically in response to detecting various conditions, where the diagnostic mode may support various diagnostic tools, including the described hardware validation procedures. In some embodiments, the diagnostic mode may involve re-booting the IHS to a diagnostic environment, while other embodiments may support diagnostic mode operations that run within the operating system of the IHS. Accordingly, some embodiments may support the described hardware validation procedures as a feature available within the operating system of the IHS. In such embodiments, the operating system may be configured to periodically conduct the described hardware validation procedures, such as on a daily or weekly basis. The operating system may likewise be configured to conduct the hardware validation procedures in response to a detected security notification, such as a notification that a process is attempting to access a protected resource. In some embodiments, the described validation procedures may be implemented remotely, such as via the described HTTPS protocols, where the remote validation procedures may rely both on information retrieved from the IHS via HTTPS and on remote information, such as information maintained by the manufacturer of the IHS or by an entity supporting the administration of the IHS.

As indicated at 535 of FIG. 5, an inventory certificate validation process 510 is initiated within a validation environment 505 that may include a pre-boot environment, a diagnostic environment or other environment supporting the validation process. In some embodiments, the inventory certificate validation process 510 operates based on validated instructions, such as based on instructions that, when used to calculate a hash value, are confirmed to correspond to a value stored in an immutable memory of the IHS during its factory provisioning. In this manner, the inventory certificate validation process 510 may be added to the root of trust of the IHS. At block 610 and as indicated at 540, the inventory certificate validation process 510 retrieves the signed inventory certificate from the remote access controller 525, or from a persistent memory of the IHS. As described above, the factory provisioning process may include uploading a signed original inventory certificate to the remote access controller or to a persistent memory of the IHS. At block 615 and at 545, the inventory certificate validation process 510 parses the hardware inventory information from the signed inventory certificate, including any included inventory of replaceable hardware components. Using the public key provided in the signed inventory certificate, the inventory validation process 510 may confirm the integrity of the inventory information that is included in the signed inventory certificate.

In some scenarios, the inventory certificate validation process 510 may commence by collecting an inventory of the hardware components that are detected by the IHS, where this detected hardware may include replaceable hardware components. In some instances, this collection of inventory information may be initiated earlier by the inventory certificate validation process, such as during initialization of the IHS. At block 620 and as indicated at 550, the inventory certificate validation process 510 may query the BIOS 515 of the IHS for an inventory of hardware components that have been detected by BIOS 515. At block 625 and as indicated at 555, the inventory certificate validation process 510 may retrieve additional hardware inventory information from a Trusted Platform Module (TPM) 520 of the IHS. In some instances, the TPM 520 may identify hardware components that are also identified by BIOS 515. However, in some instances, the TPM 520 may identify certain hardware components, such as secure memory modules, that are not identified by BIOS 515.

As described with regard to FIG. 2, a Trusted Platform Module may serve to establish an initial hardware root of trust in an IHS such that the hardware components within this root of trust operate using validated software instructions. Accordingly, in some embodiments, the inventory certificate validation process 510 may compare identity information for the detected TPM 520 against the TPM identity information that is parsed from the inventory certificate at block 545. In some instances, the detection of any discrepancies between the identity of the TPM specified in the inventory certificate and the identity reported by TPM 520 may result in terminating any further validation procedures.

At block 630, the validation process may confirm the identity of the detected TPM against the identity of the TPM reported in the signed inventory certificate. If the identity of the TPM is successfully validated, validation may continue at block 635. However, if the identity of the TPM is not validated, at block 690, the validation process may signal a core inventory validation failure since any discrepancies between the identity of the factory installed TPM and the TPM that has been detected signals a potential compromise in the root of trusted hardware components of the IHS.

At block 635 and as indicated at 560, the inventory certificate validation process 510 may retrieve additional hardware inventory and thermal information from a remote access controller 525 of the IHS. As with TPM 520, remote access controller 525 may provide redundant identification of some hardware components and may provide exclusive identification of other hardware components, such as internal memories, management controllers or logic units utilized by the remote access controller 525.

As with TPM 520, in some embodiments, the inventory certificate validation process 510 may compare identity information for the detected remote access controller 525 against the remote access controller identity information that is parsed from the inventory certificate at block 545. In some instances, the detection of any discrepancies between the identity of the remote access controller specified in inventory certificate and the identity reported by remote access controller 525 may also result in terminating any further validation procedures.

At block 640, the validation process 510 may confirm the identity of the detected remote access controller against the identity of the remote access controller reported in the signed inventory certificate. If the remote access controller is successfully validated, validation may continue at block 645. Otherwise, if the identity of the remote access controller is not validated, at block 690, the inventory certificate validation process may signal a core inventory validation failure. As with the TPM, any discrepancies between the identity of the factory installed remote access controller and the remote access controller detected in the initialized IHS signals a potential compromise of the root of trust of the IHS.

The inventory certificate validation process 510 may retrieve additional inventory from any other available data sources, such as directly from the processor of the IHS or from a chassis management controller of a chassis in which the IHS has been installed. Upon completion of the collection of the detected hardware components of the initialized IHS, at block 570, the inventory certificate validation process compares the collected inventory information of the detected components against the inventory information that is parsed from the signed inventory certificate. If the unique identifiers of the detected hardware components of the initialized IHS match the identifiers of the factory installed hardware components from the signed inventory certificate, at block 650 and 575, the inventory validation process 510 signals a successful validation of the detected hardware of the IHS as being factory-installed hardware, in some instances providing notification of the successful validation to an administrator. The customer receiving delivery of the IHS is thus assured that the IHS is operating using only hardware components that were installed at the factory during manufacture of the IHS, with no missing or additional hardware components detected.

As indicated in FIG. 5, at 552 and at 655, the validation process 510 notifies a cluster management console 530 of the successful validation of the hardware components that were detected by the IHS. As described, the inventory certificate may be factory-provisioned to specify the factory-installed hardware, and to specify whether each of these factory-installed hardware components is a replaceable component, such as replaceable memory modules 210*a-n* and storage drives 240*a-n*. In some embodiments, the validation process 510 may provide a cluster management console 530 with a listing of the individual replaceable hardware components that were detected by the IHS and validated based on the inventory certificate.

As described above, various remote management tools may be utilized in the administration of a data center. In particular, a cluster management console may be used in the management of computing clusters, such as in assigning individual IHSs to clusters, assigning computing tasks to clusters and managing the collective resources that are made available by the cluster. As part of a notification that is provided to such a cluster management console 530, the validation process 510 may report detected hardware components that have been validated and that are known to be replaceable hardware components.

As described in additional detail below, in embodiments, the cluster management console 530 utilizes the notifications of successful validations that are reported by IHSs to build and maintain an inventory of replaceable hardware components that have been reported as validated by each of the IHSs that are members of a cluster. Since the cluster management console 530 may be used in the concurrent management of multiple distinct computing clusters, the cluster management console thus builds and maintains an inventory of replaceable hardware components reported as validated in each of these clusters.

Once the cluster membership of an IHS submitting a notification has been identified, as indicated in FIG. 5, at 585, the cluster management console 530 generates a delta certificate for use in validating all of the replaceable hardware components that are known to be installed in that cluster. This delta certificate generated by the cluster management console 530 may contain an entry for each of the replaceable hardware components that been reported as validated by the IHSs that implement a computing cluster. At 590, this delta certificate may be transmitted by cluster management console 530 to the validation process 510 that provided the notification of validated hardware. The delta certificate may then be stored and used, at 595, in the ongoing validation of detected hardware by the validation process 510. In particular, this delta certificate may be used in validating replaceable hardware components that are detected by an IHS, where the delta certificate validates these components as authentic components authorized for transfer between the IHSs that are being used to implement a computing cluster.

Figure 7:
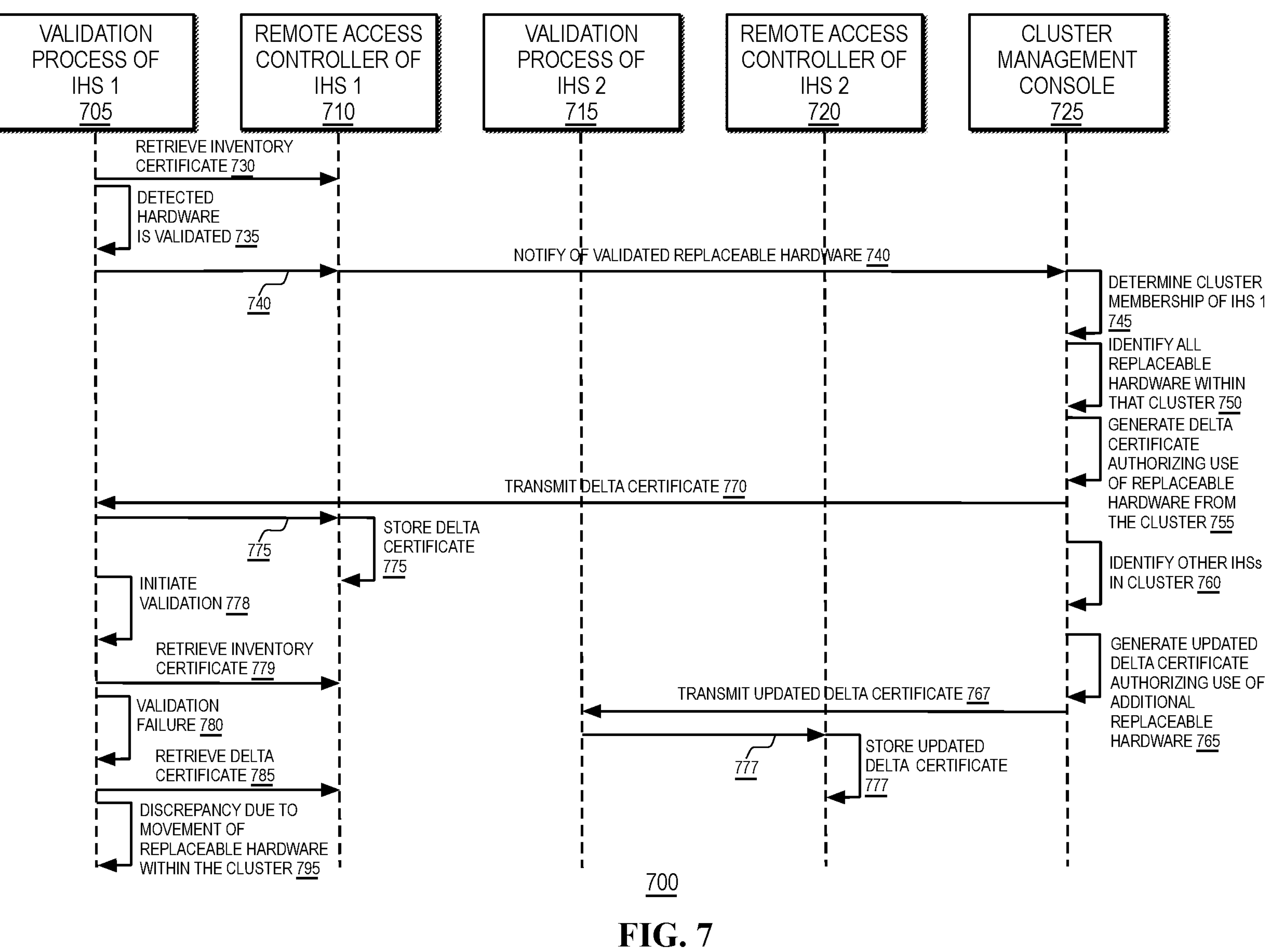
FIG. 7 is a swim lane diagram illustrating certain responsibilities of components of a system configured according to certain embodiments for validated transfer of replaceable hardware components within a cluster of IHSs.

FIG. 7 is a swim lane diagram illustrating certain responsibilities of components of a system configured according to certain embodiments for validated transfer of replaceable hardware components within a cluster of IHSs. Embodiments illustrated in FIG. 7 begin with the validation of the hardware components that are detected by an IHS, such as IHS 200 of FIG. 2A. Accordingly, embodiments may begin, at 730, with the retrieval of the factory-provisioned inventory certificate by the validation process 510 of the IHS, where the inventory certificate is retrieved from its factory-provisioned location by the remote access controller 710 of the IHS. As described above, the retrieval of the factory-provisioned inventory certificate and its use in validating the detected hardware may be initiated in a variety of scenarios, such as upon an administrator rebooting an IHS, or as part of a diagnostic procedure.

At 735, the retrieved inventory certificate is used in the validation of the detected hardware of the IHS as factory-installed. As described, this initial validation may occur upon an IHS that is factory-provisioned with an inventory certificate being received at a datacenter, or other customer location, and the received IHS is initialized for the first time by an administrator that is preparing the IHS for deployment. As described above and as indicated in FIG. 7, at 740, the validation process 705 notifies the cluster management console 725 of the successful validation of the hardware that has been detected by the IHS.

In particular, the validation process 705 notifies the cluster management console 725 of the replaceable hardware components that were successfully validated based on the factory-provisioned inventory certificate. As described, an inventory certificate may be factory-provisioned with an inventory of the factory-installed hardware of an IHS, and may specify whether any of these hardware components are replaceable hardware. In some scenarios, the inventory certificate may be factory-provisioned without certain replaceable hardware components being installed in the IHS, such as when an IHS is to be used with a pool of already available storage drives 240*a-n*. Accordingly, the inventory certificate may not include designations for any of the factory-installed hardware as being replaceable hardware, or may only include such designations for only a portion of the factory-installed hardware that are actually replaceable hardware components.

In some embodiments, the cluster management console 725 may have knowledge of some or all of the replaceable hardware components that are installed within the IHSs of a cluster. For instance, as part of its administrative capabilities, a cluster management console 725 may have a listing of the replaceable storage drives 240*a-n*, 155 that are available for use within a cluster of IHSs, such as a listing of approved storage drives provided by a customer for which the cluster is being operated. Accordingly, in scenarios where the validation process 705 has no knowledge or incomplete knowledge of the validated hardware that are replaceable hardware components, a cluster management console 725 may identify certain replaceable hardware components within the inventory of validated hardware that is reported by a validation process 705.

In various embodiments, the notification of a successful hardware validation that is indicated, at 740, may be conducted upon the initial successfully validation of the detected hardware, and may also be repeated upon any other successful validation of the detected hardware as being an authentic hardware configuration. In some instances, the validations that are conducted subsequent to the initial validation of the IHS may be conducted using only the factory-provisioned inventory certificate, or may additionally or alternatively utilize one or more delta certificates in validating modifications to the factory-installed hardware of the IHS.

As each IHS that is a member of a computing cluster is initialized and its hardware is validated against its factory-provisioned inventory certificate, the validation process 705 of that IHS issues at notification to the cluster management console 725. Based on these notifications provided by the validation processes, the cluster management console 725 builds and maintains an inventory of known detected replaceable hardware components that have been reported within each cluster that is administered by the console.

Using this inventory, at 750, the cluster management console 725 identifies the replaceable hardware components that have been reported as validated within the cluster of the IHS on which the validation process 705 operates. For the validation process 705 that is providing the cluster management console 725 with the first report of validated replaceable hardware components within a new computing cluster, the inventory of replaceable hardware components for that cluster will consist only of the replaceable hardware that is currently being reported by this validation process 705. However, as each IHS within a cluster is initialized and reports its validated replaceable hardware components, the cluster management console 725 iteratively builds a complete listing of all replaceable hardware components that have been validated and that are operating within a computing cluster.

As indicated in FIG. 7, at 755, the cluster management console 725 generates a delta certificate that specifies each of the replaceable hardware components that have been reported within the cluster of the validation process 705 IHS that has provided the notification. In some embodiments, the cluster management console 725 may generate a CSR that is used in requesting a delta certificate that validates the replaceable hardware components in this cluster. The cluster management console 725 may request the generation of delta certificates from a certificate authority that may be the same as or related to the factory certificate authority 315 utilized in the generation of the factory-provisioned inventory certificates. In other embodiments, the cluster management console 725 may rely on another trusted certificate authority, or a certificate management system 285, for generating delta certificates that can be used to validate the known replaceable hardware components that are operating in a particular cluster.

In some embodiments, the notification of validated replaceable hardware components may include information for identifying and validating each of the replaceable hardware components being reported. For instance, for each replaceable hardware component, the notification may include the digital signature that is provided in the factory-provisioned inventory certificate for that component. Whereas a unique identifier, such as a MAC address, may be used in identifying a replaceable hardware component, the digital signature may be used for authenticating the replaceable hardware component as a factory-installed component. In some embodiments, available device attestations, such as device identity certificates, for a replaceable hardware component may be provided in the notification. In embodiments, the provided information for validating a replaceable hardware components, such as the unique identifiers, digital signatures and attestations, are included for each replaceable hardware component entry in the delta certificate.

Once the delta certificate has been generated or obtained, at 770, the cluster management console 725 transmits the delta certificate to the validation process 705. As indicated in FIG. 7, the received delta certificate is then stored by the validation process 705. As with the factory-provisioned inventory certificate, the remote access controller 710 may store the received delta certificate to a protected memory device or other protected persistent data storage. In some embodiments, the remote access controller 710 may validate the received delta certificate, such as through confirmation that the delta certificate has been derived from the factory-provisioned inventory certificate maintained by the remote access controller, and through challenges issued to the certificate authority that generated the delta certificate.

With the delta certificate stored for use by the validation process 705 in validating detected hardware, an IHS may operate while configured in this manner for any amount of time before the delta certificate is used in validating hardware detected by the IHS. In some instances, the delta certificate may be used in validating modifications to the hardware of the IHS by an administrator. As described, certain replaceable hardware components may be added or removed from an IHS without shutting down the IHS, such that the IHS is not rebooted as part of the modification. In other instances, once an administrator has completed modifications to the hardware of an IHS, the IHS may be reassembled, powered and rebooted. As part of the initialization of an IHS upon making modifications, whether requiring rebooting or via hot-swapping, embodiments may provide an administrator with capabilities for initiating onboarding of the hardware modifications. This onboarding may re-initialize the validation process 705 of an IHS installed in the chassis. As described above, the validation process 705 may instead be initiated based on various detected conditions.

Once the validation process 705 of the IHS has been re-initialized, at 779, the factory-provisioned inventory certificate is retrieved from the remote access controller 710. As described above with regard to FIGS. 5 and 6A-B, the validation process 705 utilizes the inventory certificate to identify any discrepancies between the detected hardware and the factory-installed hardware. Due to the modifications made to the hardware, at 780, the validation process 705 detects a discrepancy between the detected hardware and the factory-installed inventory from the inventory certificate. In response to detecting this discrepancy, at 785, the delta certificate that was received from the cluster management console 725 and stored by the remote access controller 710 is retrieved.

Upon retrieving this delta certificate, at 795, the validation process 705 determines whether the identified discrepancies can be validated using the delta certificate. In particular, the validation process 705 determines whether any hardware components that have been detected, but that are unrecognized, are identified in the delta certificate. In scenarios where a factory-installed hardware component specified in the inventory certificate has not been detected, the validation process 705 determines whether this missing component is identified in the delta certificate. As described, the delta certificate provided by the cluster management console 725 includes digital signatures for use in validating each of the known replaceable hardware components that are being used within the computing cluster to which the IHS of the validation process 705 belongs. If the validation process 705 determines the missing/unrecognized component causing the discrepancy has an entry in delta certificate, the validation process 705 can use the information from the entry in validating the discrepancy.

As indicated in FIG. 7, in addition to transmitting the delta certificate to the validation process 705 that provided the notification of validated hardware, the cluster management console 725 may also be configured to distribute this delta certificate to the other members of the computing cluster. As described, based on the notification provided by the validation process 705, the cluster management console 725 updates its inventory of known replaceable hardware components that are operating in that cluster. If the validation process 705 has not previously reported validated replaceable hardware to the cluster management console 725, the replaceable hardware components reported by the validation process 705 may not have been known to the cluster management console 725.

In order to provide the other members of the cluster with capabilities for validating these replaceable hardware components that are being reported for the first time by the validation process 705, at 760, the cluster management console 725 identifies the other IHSs that are members of that cluster. For each of the other IHSs in the cluster, at 765, the cluster management console 725 generates a delta certificate that identifies the updated inventory of known replaceable hardware components in the cluster. As before, each entry in the delta certificate may include one or more digital signatures for identifying a specific replaceable hardware component that has been reported within the cluster.

Once generated, at 767, each delta certificate is transmitted to a validation process 715 of an IHS that is a member of the cluster, thus providing each member with an updated capability for validating all known replaceable hardware components being used within the cluster. At 777, the updated delta certificate is stored by the remote access controller 720 of this IHS to which the delta certificate is being preemptively pushed. In this manner, embodiments support transfer of replaceable hardware components within a computing cluster based on the inventory of replaceable hardware components within a respective cluster that is generated and maintained by the cluster management console 290.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system comprising:

an IHS (Information Handling System) that is a member of a computing cluster, where the IHS is configured to:

validate whether hardware detected by the IHS is factory-installed based on an inventory certificate that specifies components that were installed in the IHS during manufacture, wherein the validating the detected hardware is based at least in part on information retrieved from a root of trust that is validated as matching a root of trust identity specified in the inventory certificate;

notify, via a remote access controller that manages the IHS membership in the computing cluster, a cluster management console when the detected hardware is validated as factory-installed based on the inventory certificate, wherein the cluster management console is specified in the inventory certificate, and wherein the remote access controller is validated as matching a remote access controller identity specified in the inventory certificate;

receive a delta certificate from the cluster management console, wherein the delta certificate specifies replaceable hardware components authorized for transfer to the IHS, the specified replaceable hardware components including components previously installed in other IHSs that are members the computing cluster; and authorize one or more detected hardware components as replaceable hardware components installed in the IHS based on the delta certificate; and the cluster management console configured to:

based on the notification of validated hardware from the IHS, identify the plurality of replaceable hardware components installed within IHSs that are members of the computing cluster; and obtain the delta certificate.

2. The system of claim 1, wherein the notification provided to the cluster management console comprises a plurality of unique identifiers for identifying a first replaceable hardware component detected by the IHS.

3. The system of claim 2, wherein the notification provided to the cluster management console comprises a digital signature for validating the first replaceable hardware component detected by the IHS as a factory-installed hardware component of the IHS.

4. The system of claim 3, wherein the notification provided to the cluster management console comprises a device identity certificate for validating the first replaceable hardware component.

5. The system of claim 1, wherein the factory-provisioned inventory certificate is stored to a persistent memory of the IHS during the factory-provisioning of the IHS.

6. The system of claim 5, wherein the delta certificate is stored to the persistent memory used to store the factory-provisioned inventory certificate of the IHS.

7. The system of claim 1, wherein the cluster management console is further configured to distribute the delta certificate to all of the IHSs that are members of the computing cluster.

8. The system of claim 7, wherein the delta certificate specifies authorized transfer of the replaceable hardware component reported by the IHS to all of the IHSs that are members of the computing cluster.

9. The system of claim 1, wherein the replaceable hardware components comprise storage drives.

10. A method for validating hardware detected by an IHS (Information Handling System) that is a member of a computing cluster, the method comprising:

validating, by a validation process of the IHS, whether hardware detected by the IHS is factory-installed based on an inventory certificate that specifies components that were installed in the IHS during manufacture, wherein the validating the detected hardware is based at least in part on information retrieved from a root of trust that is validated as matching a root of trust identity specified in the inventory certificate;

notifying, by a validation process of the IHS via a remote access controller that manages the IHS membership in the computing cluster, a cluster management console when the detected hardware is validated as factory-installed based on the inventory certificate, wherein the cluster management console is specified in the inventory certificate, and wherein the remote access controller is validated as matching a remote access controller identity specified in the inventory certificate;

based on the notification of validated detected hardware from the IHS, identifying, by the cluster management console, a plurality of replaceable hardware components installed within IHSs that are members of the computing cluster;

obtaining, by the cluster management console, a delta certificate that specifies replaceable hardware components authorized for operation by the IHS, wherein the delta certificate includes one or more of the plurality of replaceable hardware components that were previously installed within other IHSs that are members of the computing cluster; and transmitting the delta certificate from the cluster management console to the IHS.

11. The method of claim 10, wherein the factory-provisioned inventory certificate is stored to a persistent memory of the IHS during the factory-provisioning of the IHS.

12. The method of claim 11, wherein the delta certificate is stored to the persistent memory used to store the factory-provisioned inventory certificate of the IHS.

13. The method of claim 10, wherein the cluster management console is further configured to distribute the delta certificate to all of the IHSs that are members of the computing cluster.

14. The method of claim 13, wherein the delta certificate specifies authorized transfer of the replaceable hardware component reported by the IHS to all of the IHSs that are members of the computing cluster.

15. The method of claim 10, wherein the one or more of the plurality replaceable hardware components comprise storage drives.

16. An IHS (Information Handling System) that is a member of a computing cluster, the IHS comprising:

one or more processors;

one or more memory devices coupled to the processors, the memory devices storing computer-readable instructions that, upon execution by the processors, cause a validation process of the IHS to:

validate whether hardware detected by the IHS is factory-installed based on an inventory certificate that specifies components that were installed in the IHS during manufacture, wherein the validating of the detected hardware is based at least in part on information retrieved from a root of trust specified in the inventory certificate;

notify, via a remote access controller of the IHS that manages the IHS membership in the computing cluster, a cluster management console when the detected hardware is validated as factory-installed based on the inventory certificate, wherein the cluster management console is specified in the inventory certificate, wherein the remote access controller is validated as matching a remote access controller identity specified in the inventory certificate, and wherein, based on the notification of validated hardware from the IHS, the cluster management console identifies a plurality of replaceable hardware components installed within IHSs that are members of the computing cluster and obtains a delta certificate that specifies replaceable hardware components authorized for transfer to the IHS, the delta certificate including one or more replaceable hardware components previously installed within other IHSs that are members of the computing cluster; and receive the delta certificate from the cluster management console.

17. The IHS of claim 16, wherein the replaceable hardware components comprise storage drives.

18. The IHS of claim 16, wherein the factory-provisioned inventory certificate is stored to a persistent memory of the IHS during the factory-provisioning of the IHS.

* * * * *